(12) United States Patent
Meier et al.

(10) Patent No.: US 8,496,081 B2
(45) Date of Patent: Jul. 30, 2013

(54) PROTECTIVE HOUSING FOR A GALVANIC CELL IN A MOTOR VEHICLE

(75) Inventors: Steffen Meier, Freudental (DE); Robert Kohr, Neustadt (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 0 days.

(21) Appl. No.: 12/395,898

(22) Filed: Mar. 2, 2009

(65) Prior Publication Data

US 2009/0236161 A1 Sep. 24, 2009

(30) Foreign Application Priority Data

Mar. 18, 2008 (DE) .......................... 10 2008 014 829

(51) Int. Cl.
*B60R 16/04* (2006.01)

(52) U.S. Cl.
USPC .................. 180/68.5; 180/65.1; 180/65.21

(58) Field of Classification Search
USPC ..................... 180/68.5, 65.1, 65.21
See application file for complete search history.

(56) References Cited

U.S. PATENT DOCUMENTS

| | | | |
|---|---|---|---|
| 5,372,216 A | 12/1994 | Tsuji et al. | |
| 5,501,289 A | 3/1996 | Nishikawa et al. | |
| 5,559,420 A * | 9/1996 | Kohchi | 180/68.5 |
| 5,585,205 A * | 12/1996 | Kohchi | 429/99 |
| 6,085,854 A * | 7/2000 | Nishikawa | 180/68.5 |
| 2001/0046624 A1 * | 11/2001 | Goto et al. | 429/99 |
| 2002/0162696 A1 * | 11/2002 | Maus et al. | 180/68.5 |
| 2004/0094115 A1 * | 5/2004 | Jatzke et al. | 123/198 E |
| 2004/0144580 A1 * | 7/2004 | Wu | 180/68.5 |
| 2005/0205316 A1 | 9/2005 | Yamafuji | |
| 2006/0096794 A1 * | 5/2006 | Yoshida | 180/65.1 |
| 2007/0114083 A1 * | 5/2007 | Asao et al. | 180/68.5 |
| 2007/0115707 A1 * | 5/2007 | Koide | 363/146 |
| 2007/0151785 A1 * | 7/2007 | Huang | 180/68.5 |
| 2007/0238015 A1 * | 10/2007 | Kubota et al. | 429/120 |
| 2008/0196957 A1 | 8/2008 | Koike et al. | |

FOREIGN PATENT DOCUMENTS

| | | |
|---|---|---|
| CN | 101049799 | 10/2007 |
| DE | 10132191 | 1/2003 |
| DE | 60215229 | 6/2005 |
| DE | 11 2005 000 492 | 4/2007 |
| DE | 10 2007 023 391 | 11/2008 |
| EP | 1403144 | 3/2004 |
| JP | 781431 | 3/1995 |
| JP | 2005-297861 | 10/2005 |
| JP | 2007-8443 | 1/2007 |
| WO | 2007095663 | 8/2007 |

* cited by examiner

*Primary Examiner* — Hau Phan
*Assistant Examiner* — Bryan Evans
(74) *Attorney, Agent, or Firm* — Gerald E. Hespos; Michael J. Porco; Matthew T. Hespos

(57) ABSTRACT

A protective housing (1) for a galvanic cell in a motor vehicle four side walls (2a, 2b, 3a) that form a lateral enclosure for a receptacle space for the galvanic cell. A base and a cover (4) extend across the lateral enclosure of the receptacle space. A cover cross member (8) is attached to the cover (4) and projects out beyond two opposed side walls (2a, 2b) for connection to a shell of the motor vehicle so that the protective housing (1) is suspended in a rotationally fixed fashion in the motor vehicle.

7 Claims, 1 Drawing Sheet

PROTECTIVE HOUSING FOR A GALVANIC CELL IN A MOTOR VEHICLE

BACKGROUND OF THE INVENTION

1. Field of the Invention

The invention relates to a protective housing for a galvanic cell in a motor vehicle. In this context, protective housing means a structure that can reliably absorb or pass on forces that occur in a crash without relatively severe damage to the protective housing or the galvanic cell therein. The galvanic cell preferably is a high voltage battery, such as a lithium ion or a nickel metal hydride battery.

2. Description of the Related Art

U.S. Pat. No. 5,501,289 discloses a relatively complex floor structure for an electric vehicle that is used for accommodating batteries.

DE 11 2005 000 492 discloses a storage battery arrangement with a mounting structure that can be attached to a longitudinal member and cross member of a vehicle. However, a mounting structure mounted in this way can become twisted in a crash and, as a result, can damage adjacent elements, such as a fuel tank, that do not lie in the load path.

DE 10 2007 023 391 discloses a protective housing for a vehicle battery having two transverse walls and two longitudinal walls that together form a lateral enclosure. At least two base cross members and at least two cover cross members are provided on the enclosure for attachment in the motor vehicle. DE 10 2007 023 10 2007 023 391 was not published before the priority date claimed herein.

The object of the invention is to provide a protective housing for a galvanic cell, in particular a high voltage battery, in a motor vehicle. It is another object of the invention to provide such a protective housing that is of simple design, that can be used universally and that is relatively secure in the event of a crash.

SUMMARY OF THE INVENTION

The invention relates to a protective housing for a galvanic cell in a motor vehicle. The protective housing has four side walls that together form a lateral enclosure for a receptacle space for the galvanic cell. The protective housing also has a base and a cover that bound opposite bottom and top regions of the receptacle space. A cover cross member is attached to the cover and projects out beyond two of the opposite side walls. The cover cross member enables the protective housing to be connected to a shell of the motor vehicle in a rotationally fixed fashion and to achieve a suspended mounting the receptacle space. The base and the cover reinforce the protective housing and enclose the receptacle space to produce an enclosed protective housing. The receptacle space defines a stable cage that deforms only to a relatively small degree even in the event of a crash, thereby avoiding damage to the galvanic element accommodated therein. The configuration of the lateral enclosure, the cover and the base provides a flexurally stable and flexurally rigid protective housing and causes a load that causes a load that occurs in a crash to be taken up and/or passed on in an optimum way.

This crash-proof configuration results in an inherently stable structure and permits the use of the separate cover cross member for attaching the receptacle space in a suspended fashion. More particularly, the cover cross member projects out laterally beyond the receptacle space so that the protective housing can be mounted in a suspended fashion in the shell of the vehicle. The weight of the protective housing is supported essentially by the cover cross member, and the connection between the cover cross member and the shell of the vehicle is merely for the purpose of attachment. As a result the connection between the cover cross member and the shell of the vehicle can be of relatively simple design and can be achieved, for example, by clamps, screws, bolts or other suitable attachment means. As a result, further support, for example on the lateral enclosure or the base of the receptacle space can be dispensed with. Nevertheless, a high degree of safety with respect to crashes is achieved because the protective housing is suspended in equilibrium after oscillation has stopped, and therefore is mounted in a rotationally fixed fashion.

The protective housing and the accommodated galvanic cell can be dismounted easily merely by releasing the corresponding connections, such as the electric connections and if appropriate the mechanical connection of the cover cross member that secures the protective housing to the shell of the vehicle. The protective housing then can be removed from the motor vehicle and serviced or replaced.

The protective housing is universally applicable to a plurality of different installation spaces can by employing a correspondingly configured cover cross member, which constitutes a structurally simple modification of the protective housing. More particularly, the protective housing does not need additional screwing points or other necessary connecting points to the shell of the motor vehicle. Instead the protective housing merely is mounted in the motor vehicle in a suspended fashion by the appropriately configured cover cross member.

The protective housing enables new installation spaces to be available by virtue of the suspended mounting. These additional installation spaces include those that do not have lateral attachment possibilities for a corresponding protective housing.

The side walls, the base and the cover may be substantially planar and may be fabricated from metal to provide flexural stability or flexural rigidity of the protective housing in all directions. As a result, the load that occurs in the event of a crash is accommodated or passed on particularly well.

The side walls may comprise extruded sections. The extruded sections exhibit sufficient rigidity and safety in crashes and have a relatively low weight. The extruded sections also enable a large number of structural possibilities. For example, the extruded sections can form chambers that can be made more rigid by inserting reinforcing sections that are made, for example, of steel.

The side walls preferably are separate components that are assembled, for example, by welding to form an enclosure. Thus, the protective housing is particularly easy to manufacture.

The protective housing achieves a stable position and high degree of protection against twisting. In particular, the cover cross member extends in a surface-covering fashion over more than half of the cover. The cover cross member projects out over two opposite side walls. Therefore, more than half of the area of the cover is covered in the direction orthogonal to the opposite side walls from which from which the cover cross member projects. In this context, the cover cross member can be screwed to the cover. This simple and effective way of connecting the cover cross member is made possible due to the stable structure of the protective housing.

The cover cross member preferably comprises two spaced apart sectional elements that are connected to one another by a further sectional element. The two spaced apart sectional elements may have a hollow part or recess defined, for example, by an L-shaped cross section. The further sectional element then is inserted into the hollow part or recess and welded in position. This design is warp-resistant and relatively lightweight.

The cover cross member preferably is screwed to the shell of the motor vehicle to secure the protective housing reliably. For this purpose, lateral end regions of the cover cross member have openings for screwing in the shell. As a result, the protective housing can be dismounted easily. Furthermore, the corresponding screws, the electrical connections of the galvanic cell and, if appropriate, further connections can be released easily so that the protective housing simply can be pulled out of the motor vehicle. Accordingly, a new protective housing can be mounted together with the galvanic cell in a suspended fashion during servicing of the motor vehicle. Of course, it is possible to provide clamps or other attachment means.

The side walls, the base, the cover and/or the cover cross member preferably are fabricated from aluminum to provide a particularly lightweight protective housing.

The protective housing together with the galvanic cell may be retrofitted to form a complete power supply module for a motor vehicle. For this purpose, elements for air-conditioning, in particular for cooling, the galvanic cell preferably are provided on at least one side wall of the protective housing. This assembly defines a power supply module that can be installed merely by making the necessary electrical connections and connecting corresponding feed lines and discharge lines for the air conditioning medium.

The protective housing may include means for air cooling the galvanic cell. The air cooling means may include a discharged air collector with a collecting element for carrying away the discharged air. It is therefore possible to form an electrical vehicle or hybrid vehicle in a simple way in terms of production technology. Specifically, the protective housing simply needs to be mounted in a suspended fashion and secured. The galvanic cell then is connected electrically and the protective casing is connected to lines for feed air and discharged air.

A control unit for electrically monitoring and controlling the galvanic cell preferably is provided in the region of the cover and the cover cross member preferably has a breakthrough in this region. The control unit enhances the module character of the protective housing and the galvanic cell. The control unit preferably can be accessed through the breakthrough in the cover cross member for servicing. The breakthrough and/or the position of the breakthrough are selected so that the stability of the cover cross member is not affected adversely.

The motor vehicle preferably has two spaced apart longitudinal members and the protective housing is mounted in a suspended fashion between the longitudinal members so that end regions of the cover cross member bear respectively on the longitudinal members. The longitudinal members constitute particularly stable support points. Here, it is possible to adapt to conditions of the motor vehicle, i.e. the installation space, irrespective of the size of the galvanic cell merely by correspondingly dimensioning the length of the cover cross member. It is then possible to screw the end regions of the cover cross member to the supporting regions of the respective longitudinal members to form a secure connection.

The motor vehicle may be a hybrid vehicle. Additionally, a conventional motor vehicle can be provided with a significant component for hybridization by simply mounting the protective housing of the invention in a suspended fashion in a suitable installation space. The rear region of the motor vehicle is the preferred installation space. Thus, the upper edge of the cover cross member bears approximately in the region of the lower edge of the floor pan. As a result, new installation space underneath the floor pan is made available for the galvanic cell, but none of the volume of the trunk is lost. If necessary, a spare wheel for the motor vehicle can be dispensed with.

DETAILED DESCRIPTION OF THE PREFERRED EMBODIMENT

Figure 1:
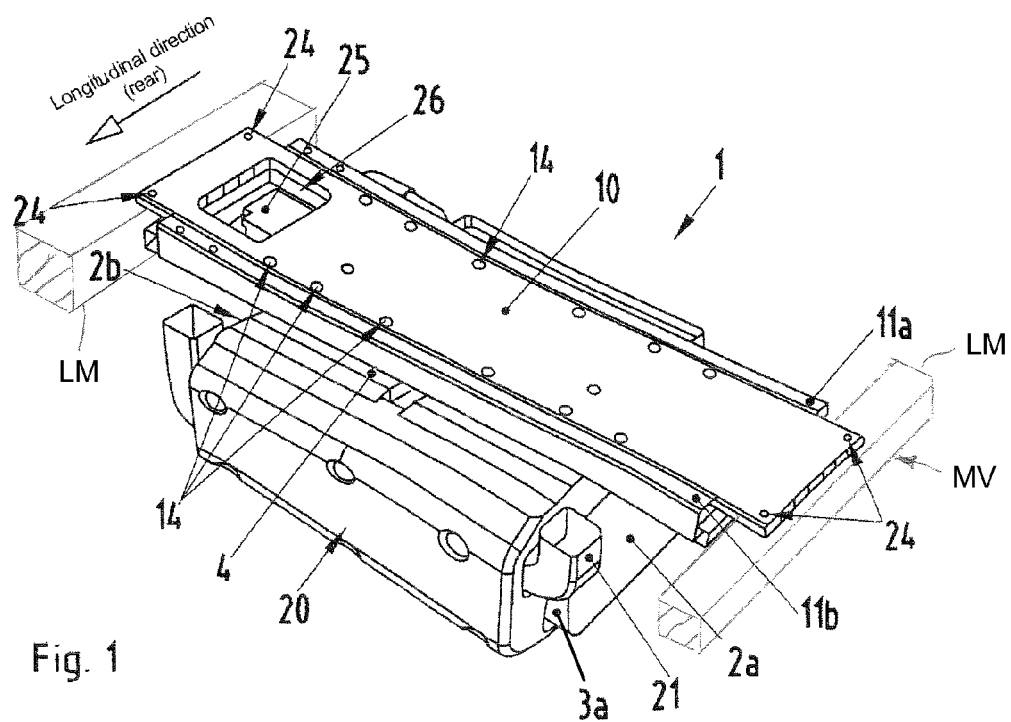
FIG. 1 is a schematic illustration of a protective housing according to the invention.
Figure 2:
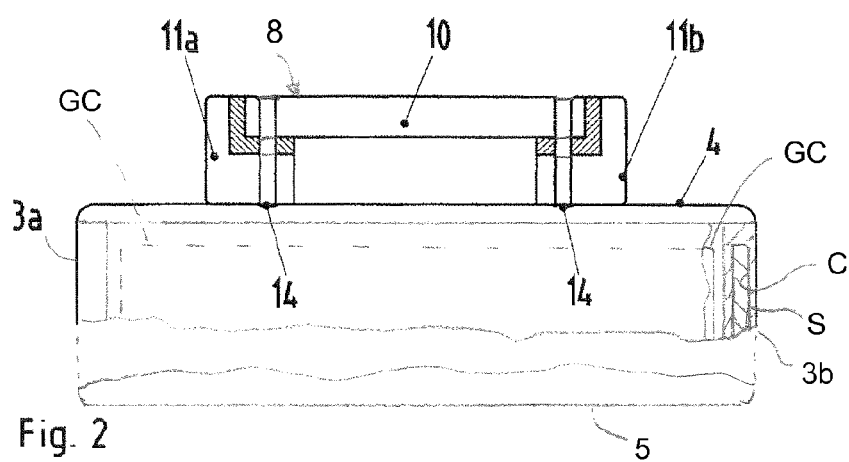
FIG. 2 is a cross sectional view of the cover cross member of the protective housing.

A protective housing for a galvanic cell GC of a motor vehicle MV is identified generally by the numeral 1 in FIG. 1. The protective housing 1 has two substantially planar longitudinal walls 2a, 2b that extend in the longitudinal direction of the motor vehicle MV. In addition, the protective housing 1 has a rear transverse wall 3a and a front transverse wall 3b, as shown in FIG. 2. The transverse walls 3a, 3b extend transverse to the longitudinal direction of the motor vehicle. The protective housing 1 also has a cover 4 and a base 5 opposed to the cover 4. The side walls 2a, 2b, 3a, 3b, the cover 4 and the base 5 are elements of an enclosed receptacle space for accommodating the galvanic cell. These elements are fabricated as individual parts in the form of aluminum extruded sections and then sections and then are combined to form the receptacle space. Depending on requirements, these elements may form chambers C in at least certain areas. The chambers C may be reinforced as required with inserted steel sections S. The individual elements are welded to one another or are attached in another suitable way.

The protective housing 1 also includes a cover cross member 8 that is attached to the cover 4. The cover cross member 8 has a sectional element 10 that connects two sectional elements 11a, 11b. The sectional elements 11a, 11b are L-shaped chamber sections in the illustrated embodiment. The sectional element 10 is a hollow chamber plate that is inserted in the two L-shaped sectional elements 11a, 11b. The sectional elements 10, 11a, 11b preferably are manufactured from aluminum. Openings 14 are provided through the cover cross member 8 and can receive screws for attaching the cover cross member 8 on the cover 4. The openings 14 are located on the lateral sides of the cover cross member 8 and hence are aligned transverse to the longitudinal direction of the motor vehicle MV since the lateral sides of the cover cross member 8 are transverse to the longitudinal direction of the motor vehicle MV. This structure is more resistant to twisting in the event of a crash, as compared to a cover cross member that extends in the longitudinal direction of a motor vehicle. The cover cross member 8 is screwed to the cover 4 using screws or bolts in the openings 14. Of course, the cross member also can be formed in one piece and/or attached to the cover 4 in some other way, for example by welding.

The protective housing 1 can be retrofitted to form a complete power supply module for a hybrid vehicle. For this purpose, the protective housing 1 has an air conditioning module for the accommodated galvanic cell GC. The air conditioning module has a discharged air collector 20 with a discharged air connection 21. A battery manager 25 also is provided as a control unit for controlling and monitoring the galvanic cell GC. An opening 26 extends through the cross members 8 so that the battery manager 25 is accessible for servicing.

The protective housing 1 is embodied as a module for supplying electrical energy. The module merely has to be mounted in a suspended fashion in a motor vehicle MV. Accordingly, a corresponding installation space is provided between two longitudinal members LM in the shell of the motor vehicle MV for accommodating the protective housing 1. To secure the protective housing 1 firmly in the shell of the motor vehicle, the cover cross member 8 has openings 24 in its two end regions—viewed in the transverse direction—for forming a screwed connection of the protective housing 1 to the longitudinal members LM in the shell of the motor vehicle. As a result of the correspondingly wide configuration of the cover cross member 8, the protective housing 1 is arranged in the motor vehicle MV in a way that is secured against twisting. Electrical contact then is made with the battery manager 25 and the feed lines and discharged air lines are connected via the corresponding connections, such as the discharged air connection 21. This easily permits an essential component of a hybrid vehicle to be installed in a conventional motor vehicle. Forwardly directed longitudinal forces are applied to the protective housing 1 if the motor vehicle is involved in a rear-end crash. These forces are taken up by the transverse component 3a and passed further forward via the side parts 2a, 2b. For this purpose, the protective housing 1 preferably is arranged behind a cross member, in order to take up the energy and to pass the energy on to corresponding longitudinal members LM of the motor vehicle MV. The side walls 2a, 2b, 3a, 3b, the cover 4 and the base 5 preferably are formed from metal and are substantially planar so that energy from the crash is passed on in an optimum way.

A system of protective housings 1 can be provided to fit in differently dimensioned installation spaces of a plurality of different motor vehicles MV. The side walls 2a, 2b, 3a, 3b, the cover 4 and the base 5 of the protective housings 1 in the system may all be the same. A cover cross member 8 that is dimensioned for the installation space of a particular motor vehicle MV then is selected and is secured to the standard cover 4. The protective housing 1 then is secured in the installation space as described above.

What is claimed is:

1. A motor vehicle comprising:
   left and right longitudinal members extending in a longitudinal direction of the motor vehicle and spaced from one another in a lateral direction of the motor vehicle to define an installation space therebetween;
   a power supply module having a protective housing arranged in the installation space, the protective housing having opposite left and right side walls extending in the longitudinal direction of the motor vehicle and disposed respectively in opposed relationship to the left and right longitudinal members and spaced inwardly from the left and right longitudinal members, opposite front and rear walls extending in the lateral direction of the motor vehicle, the front and rear walls being connected to the opposite left and right side walls to define a side wall enclosure for the protective housing, a cover extending across top ends of the left and right side walls and the front and rear walls, and a base opposite the cover and extending across bottom ends of the left and right side walls and the front and rear walls, a galvanic cell disposed in a receptacle space defined between the front and rear walls, the left and right side walls, the cover and the base; and
   a cover cross member having opposite front and rear sectional elements and a plate with opposite front and rear regions nested with the respective front and rear sectional elements, opposite left and right ends of the front and rear sectional elements extending laterally beyond the protective housing and facing opposed inward facing surfaces of the respective left and right longitudinal members, front and rear arrays of attachment members extending through the respective front and rear regions of the plate and through the front and rear sectional elements, the attachment elements being attached to a surface of the cover facing away from the base and at positions inward of the front and rear walls of the protective housing, left and right end regions of the plate of the cover cross member projecting respectively beyond the left and right side walls of the protective housing and being supported on top surfaces of the respective left and right longitudinal members, attachment means at the left and right end regions of the cross member for dismountably securing the left and right end regions of the plate respectively to the left and right longitudinal members of the motor vehicle so that the protective housing with the galvanic cell therein is suspended removably from the cross member and in the installation space and spaced inward of the longitudinal members for protecting the protective housing in a crash.

2. The motor vehicle of claim 1, wherein the respective end regions of the cover cross member are screwed at plural locations to supporting regions of the respective longitudinal members.

3. The motor vehicle of claim 1, wherein the installation space is provided in a rear region of the motor vehicle, and wherein an upper edge of the cover cross member bears approximately in a region of a lower edge of a floor pan of the motor vehicle.

4. The motor vehicle of claim 1, wherein elements for air-conditioning the galvanic cell are provided on at least one of the side walls.

5. The motor vehicle of claim 4, wherein the elements for air conditioning comprise a discharged air collector with a connecting element for carrying away discharged air.

6. The motor vehicle of claim 1, wherein a control unit for electrically monitoring and controlling the galvanic cell is provided in a region of the motor vehicle between the protective housing and one of the longitudinal members and below the plate of the cover cross member.

7. The motor vehicle of claim 6, wherein the cover cross member has a breakthrough spaced inward from the opposite front and rear regions of the cover cross member for accessing the control unit without adversely affecting structural stability of the cover cross member.

* * * * *